United States Patent [19]

Clements

[11] 4,357,605
[45] Nov. 2, 1982

[54] CASH FLOW MONITORING SYSTEM

[75] Inventor: Kenneth P. Clements, Santa Cruz, Calif.

[73] Assignee: Metallurgical Research, Inc., San Francisco, Calif.

[21] Appl. No.: 138,795

[22] Filed: Apr. 8, 1980

[51] Int. Cl.³ .............................................. H04M 11/04
[52] U.S. Cl. .......................... 340/825.14; 340/825.06; 340/310 R
[58] Field of Search ........... 340/147 P, 152 T, 310 R, 340/310 A, 170, 825.06, 825.14, 825.02, 825.54, 825.55

[56] References Cited

U.S. PATENT DOCUMENTS

| | | | |
|---|---|---|---|
| 3,238,459 | 3/1966 | Landee | 340/170 |
| 3,349,181 | 10/1967 | Ito | 340/170 |
| 3,818,466 | 6/1974 | Honda | 340/216 |
| 3,842,408 | 10/1974 | Wells | 340/216 |
| 3,922,664 | 11/1975 | Wadsworth | 340/276 |
| 3,986,121 | 10/1976 | Oehrli | 340/310 A |
| 4,012,734 | 3/1977 | Jagoda | 340/310 A |
| 4,024,528 | 5/1977 | Boggs | 340/310 A |
| 4,072,930 | 2/1978 | Lucero | 340/152 T |
| 4,204,194 | 5/1980 | Bocacki | 340/310 A |

Primary Examiner—Harold I. Pitts
Attorney, Agent, or Firm—Townsend and Townsend

[57] ABSTRACT

A computerized monitoring system which incorporates the power lines that provide electrical power to the remote devices as the physical communications medium of a serial data bus for the computer system. The system comprises a central computer and a plurality of computerized sensor modules within the individual remote devices. The central computer and each of the sensor modules has associated with it a respective data link for coupling respective signal generating and receiving means to the power distribution lines and for manipulating the signals to and from a form suitable for transmission on the power distribution lines. Phase shift keying is used wherein binary bits of data are represented as 180° phase shifts of the pulses in a carrier pulse train. A data transmission rate of approximately 15,000 baud with a carrier frequency of 120 kHz is typical. A polling signal includes a preamble of pure carrier frequency, followed by the serial number of the device being polled, followed by the data (or instructions) defining the message content. Each data link has its own clock for generating a pulse train at a frequency very close to the common carrier frequency, and includes means for bringing its own carrier frequency pulse train approximately into a predetermined phase relationship with the carrier train that is appearing on the power lines.

14 Claims, 12 Drawing Figures

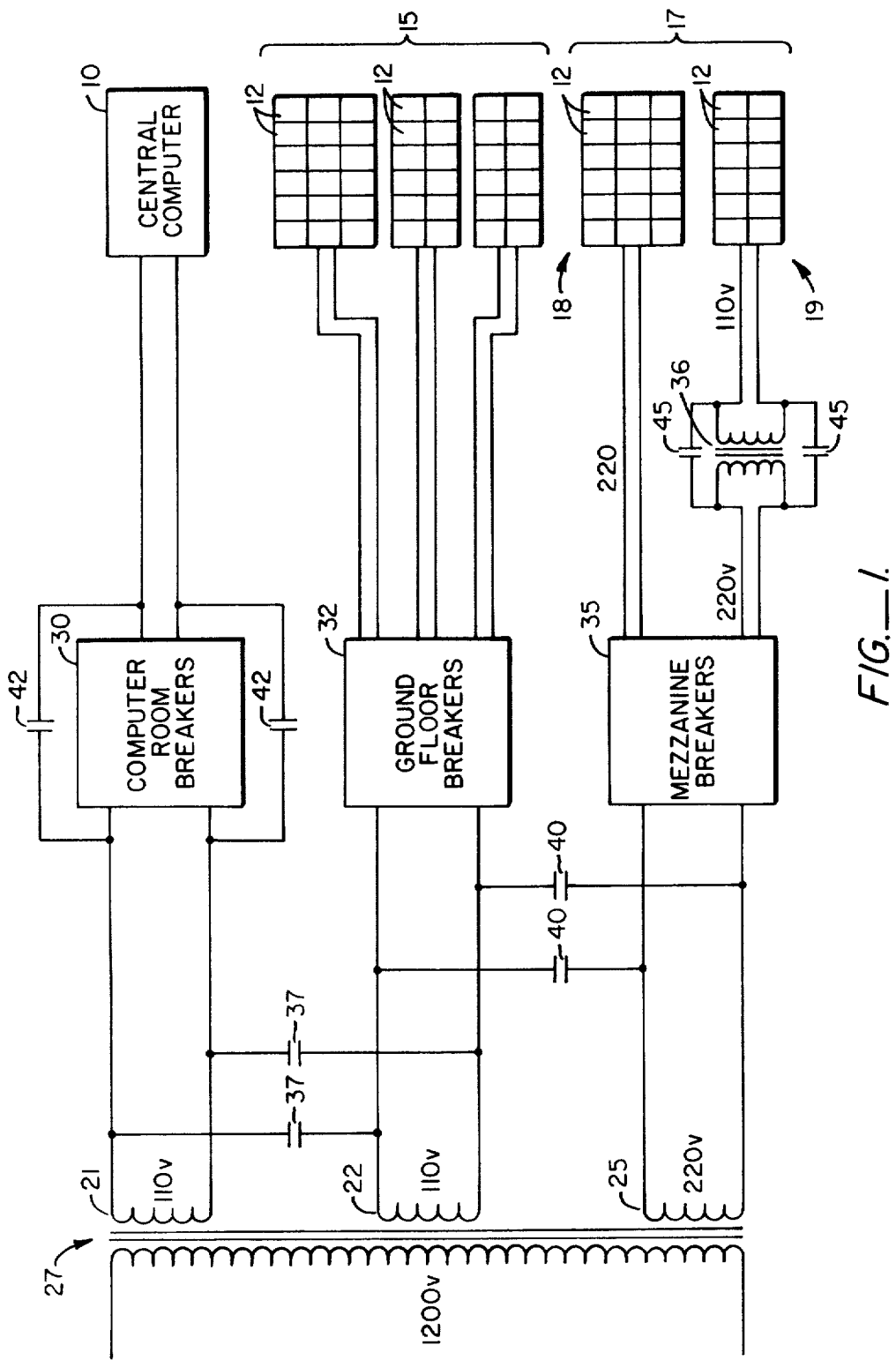
FIG._1.

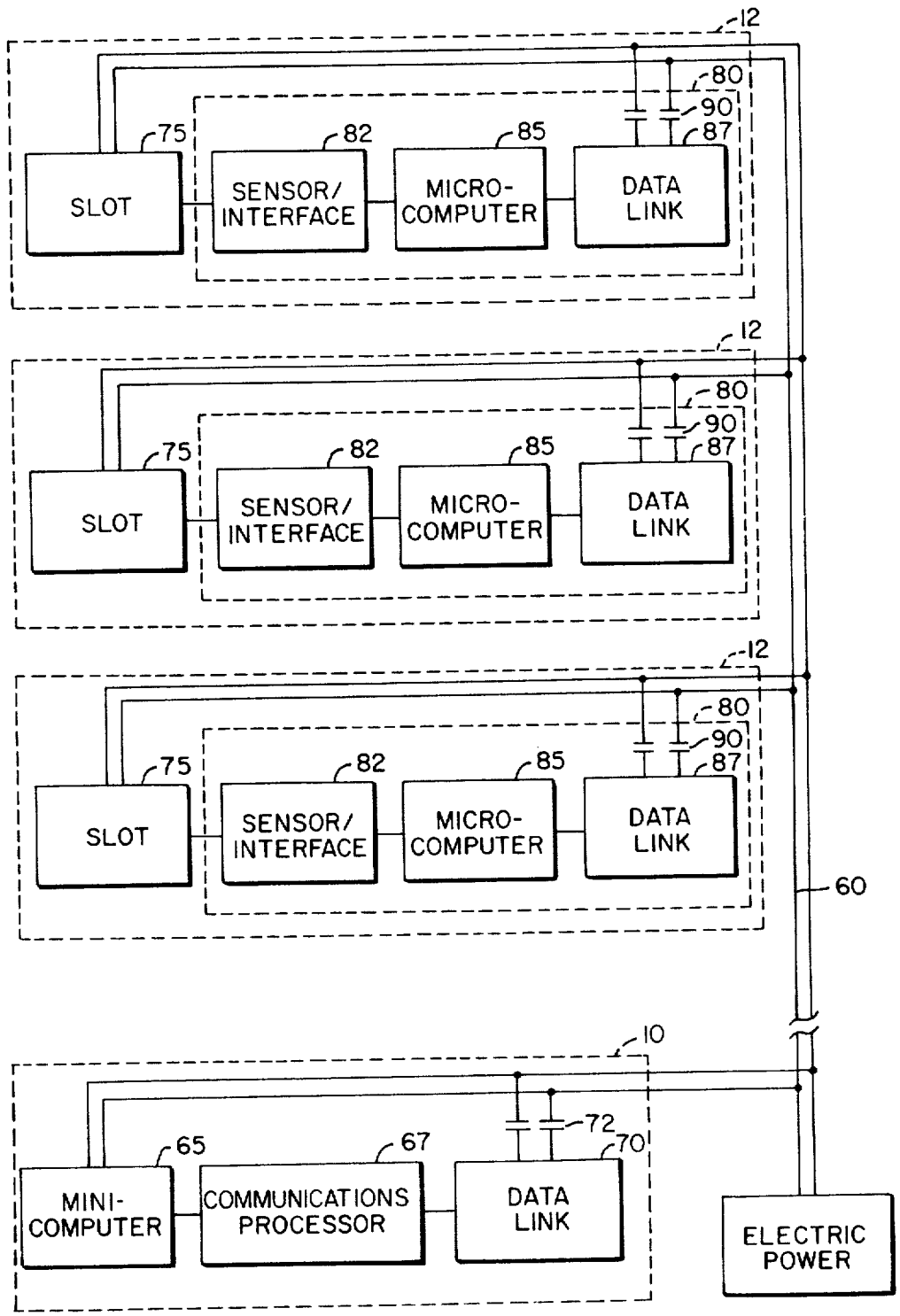
FIG._2.

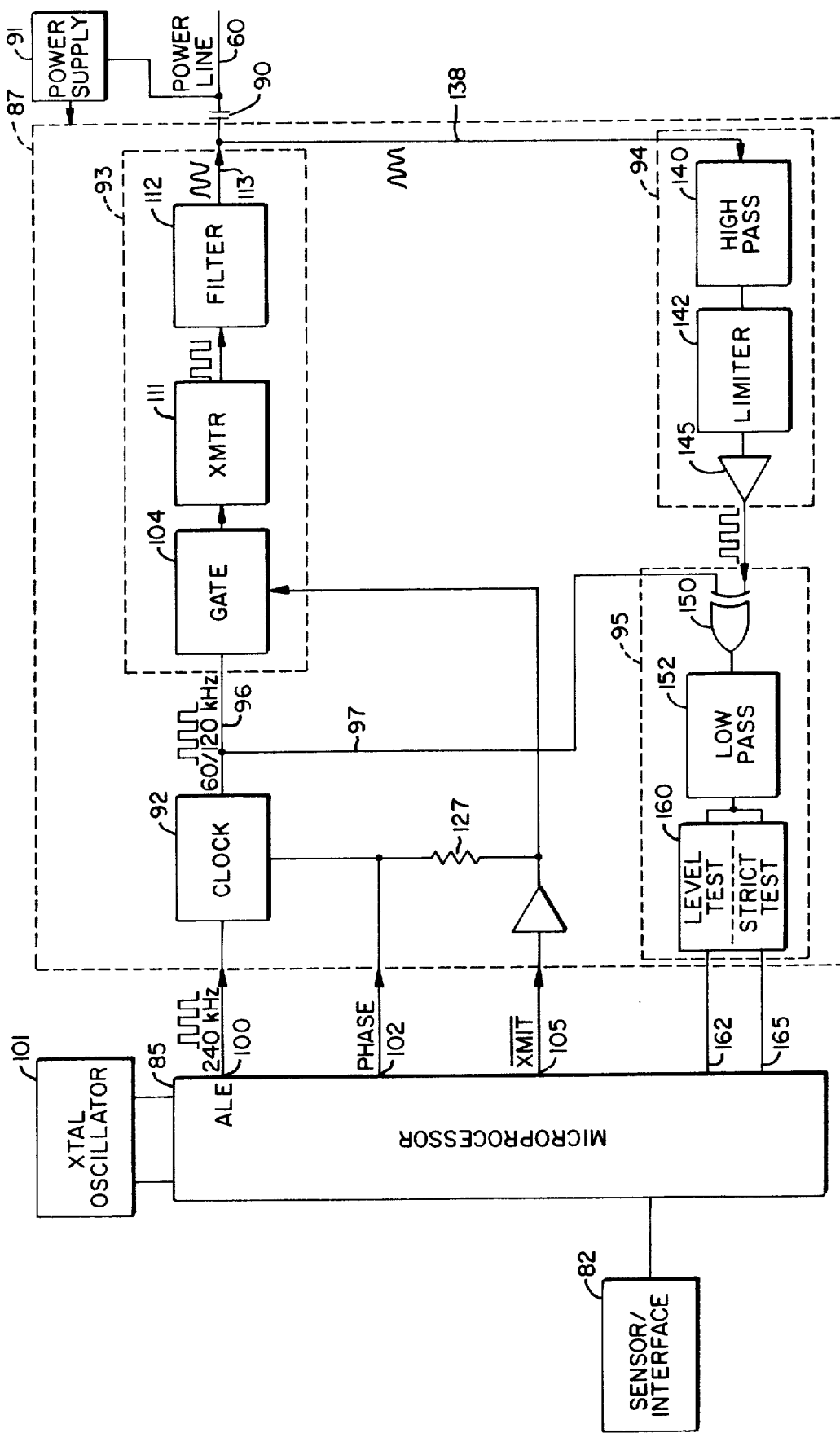
FIG._3.

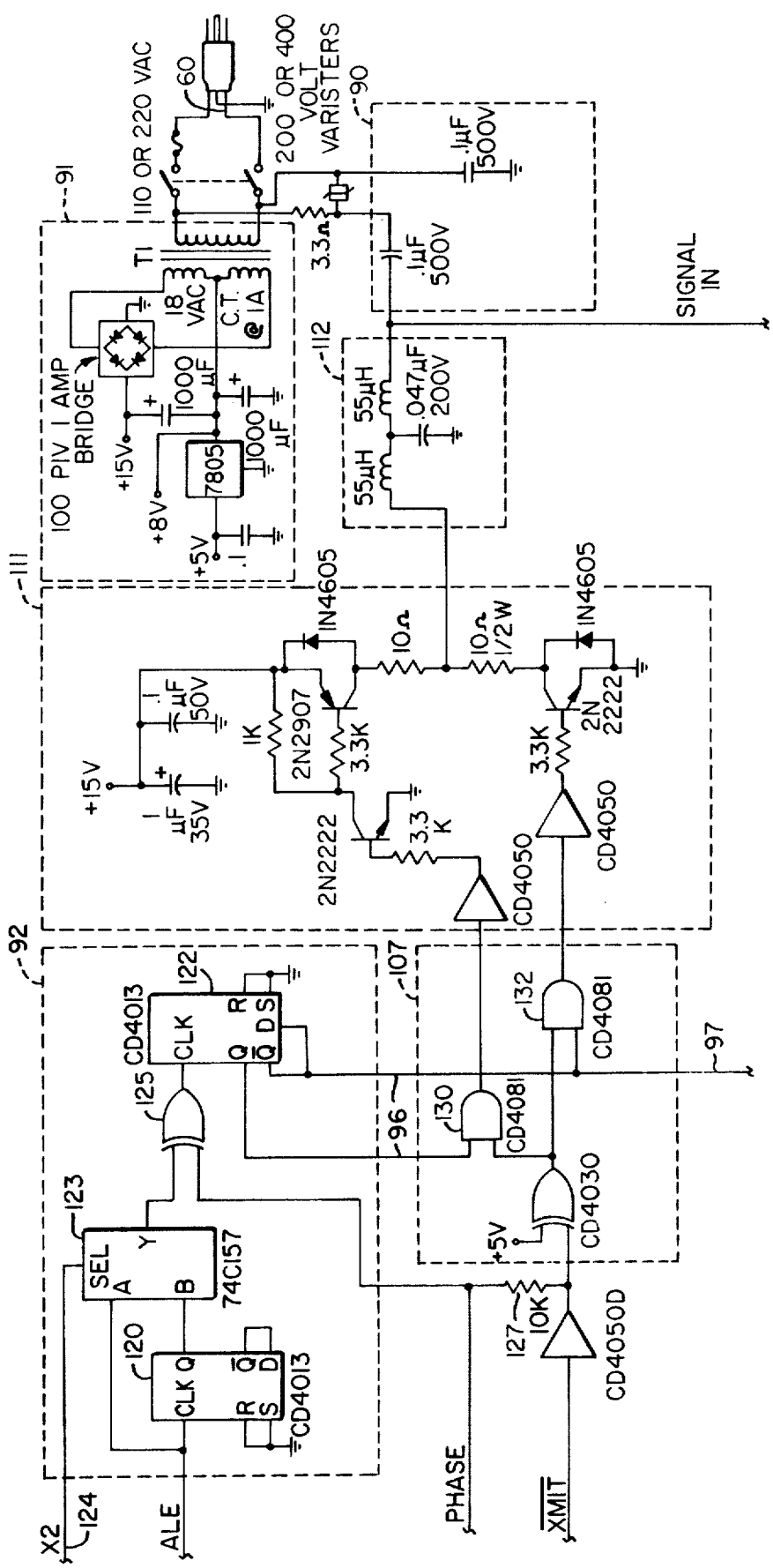
FIG._4A.

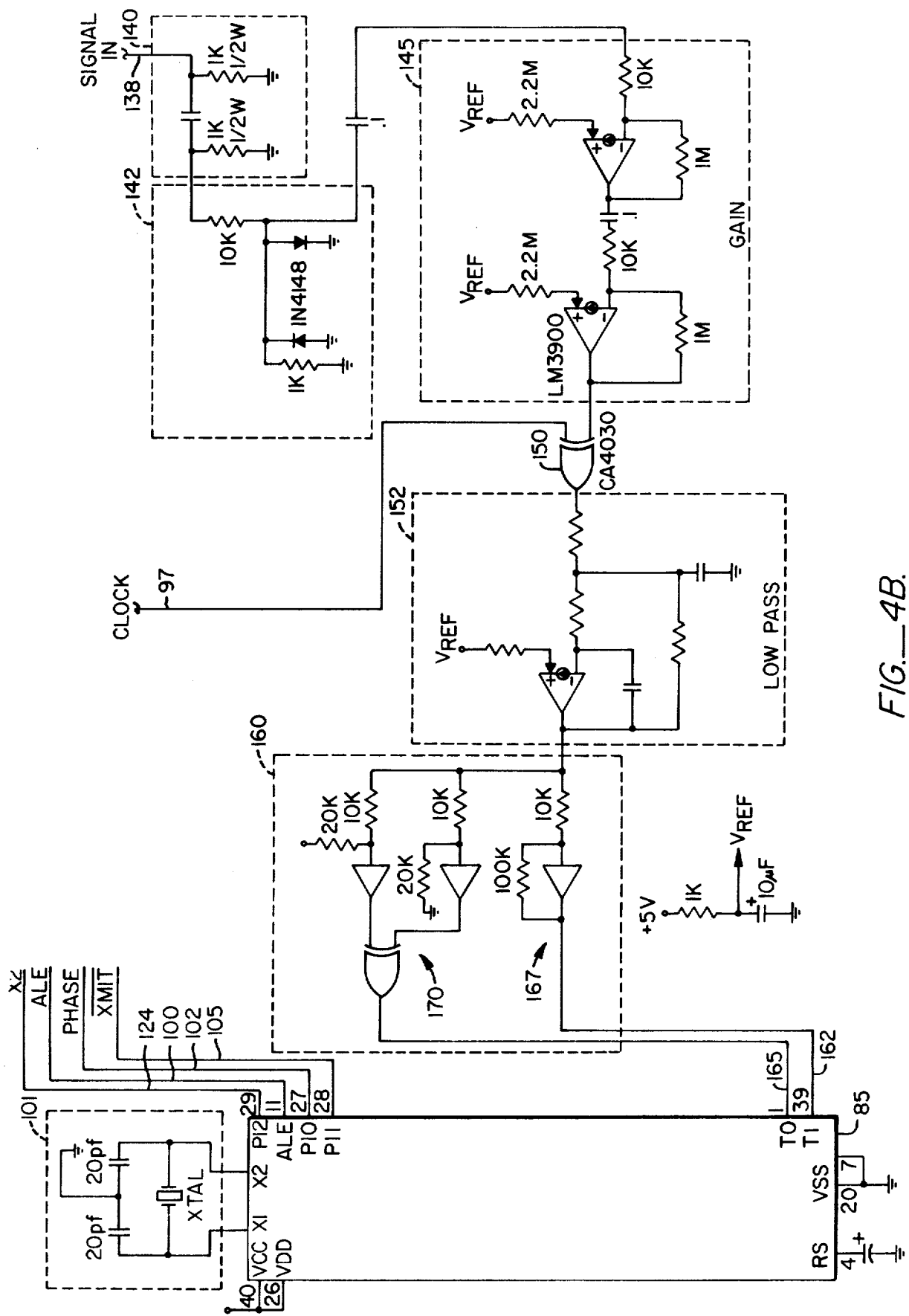
FIG._4B.

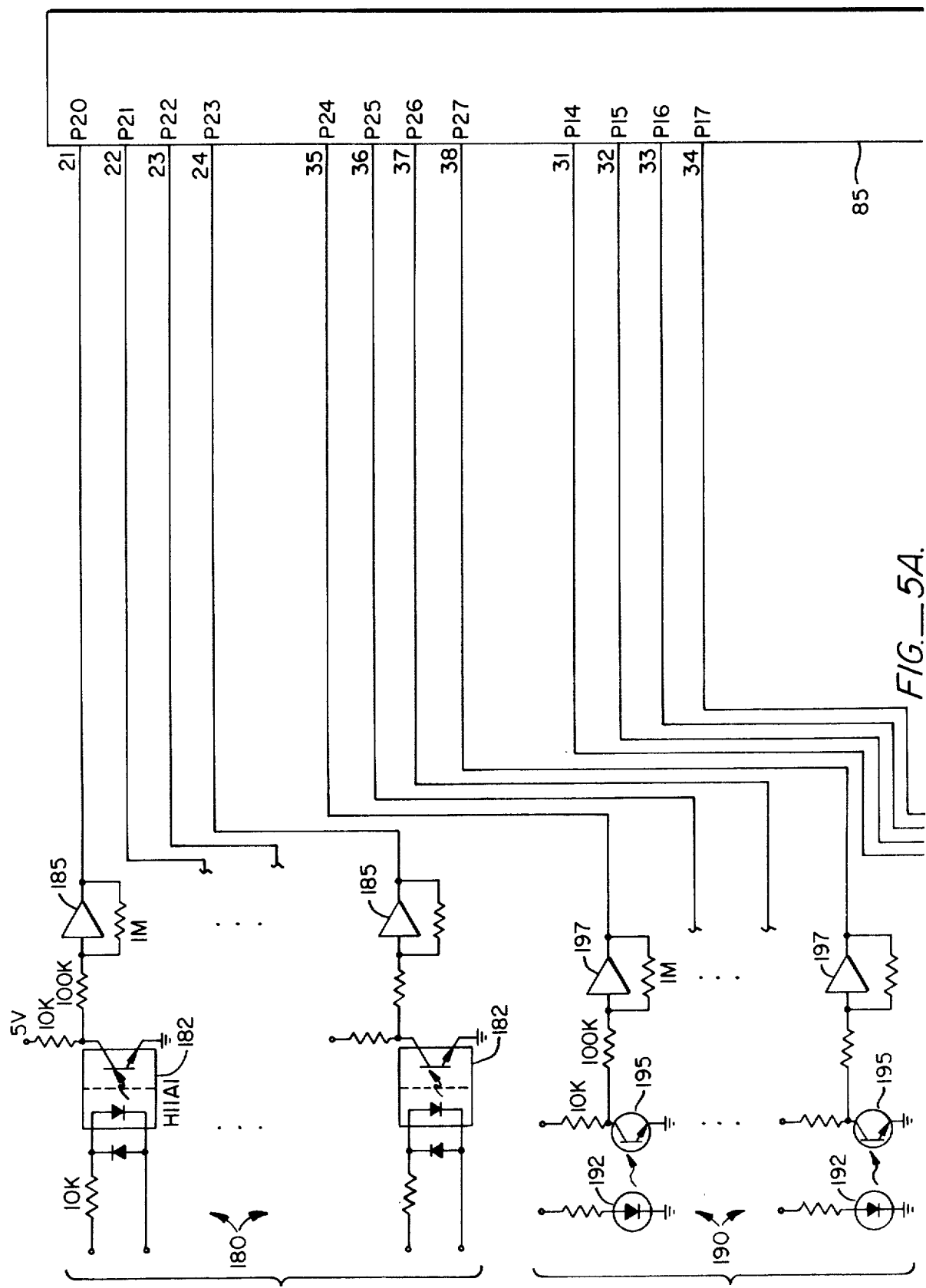
FIG._5A.

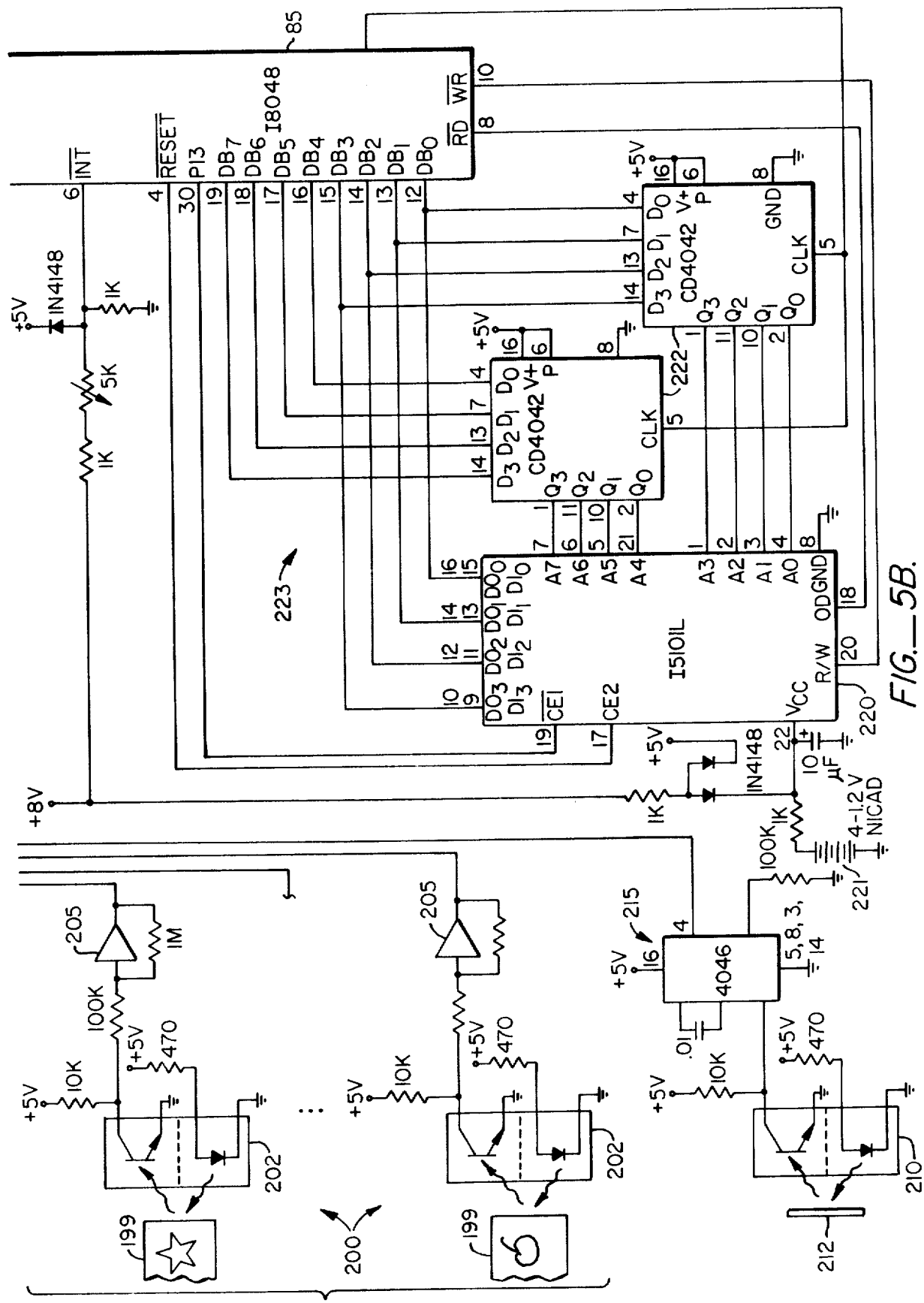
FIG._5B.

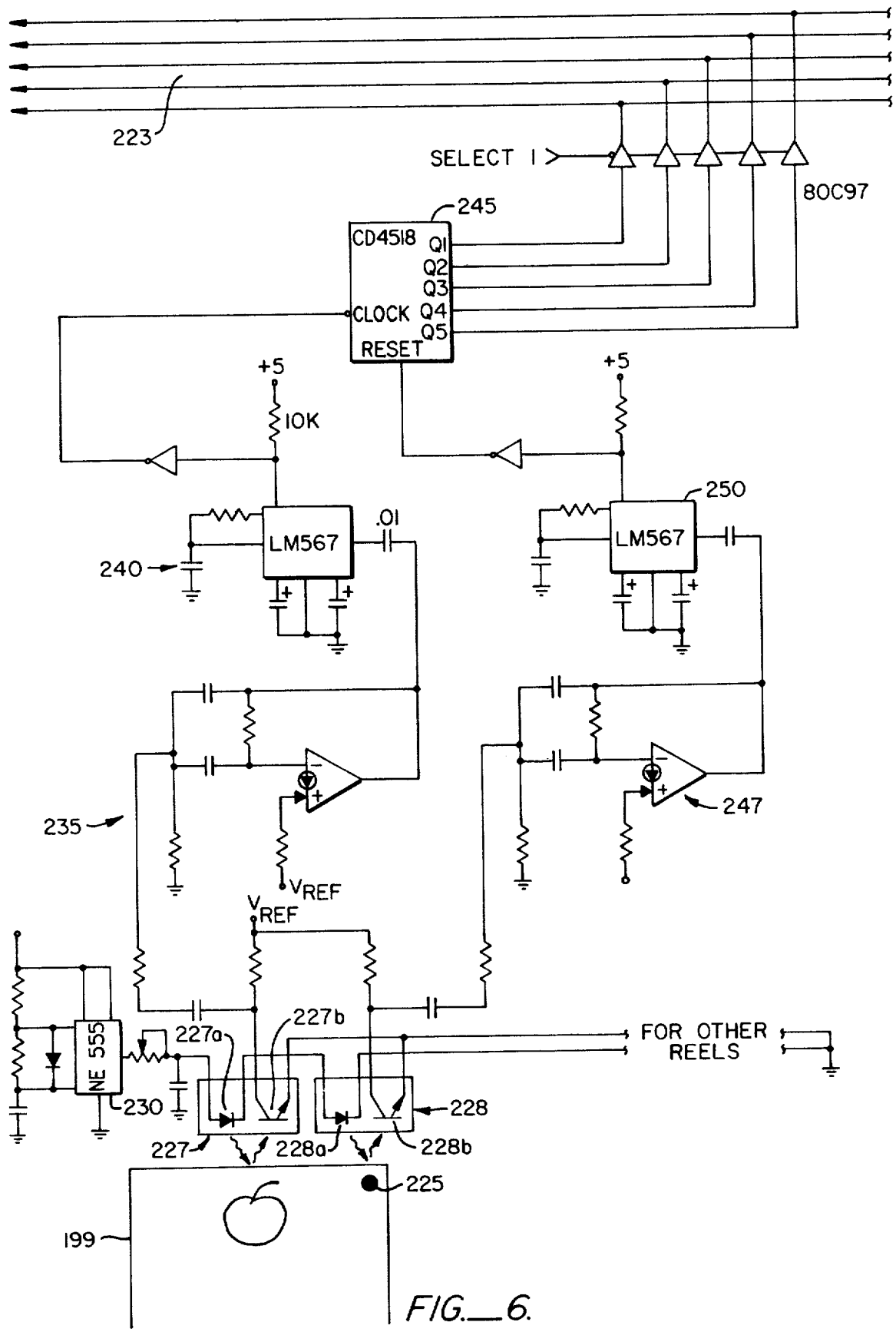
FIG._6.

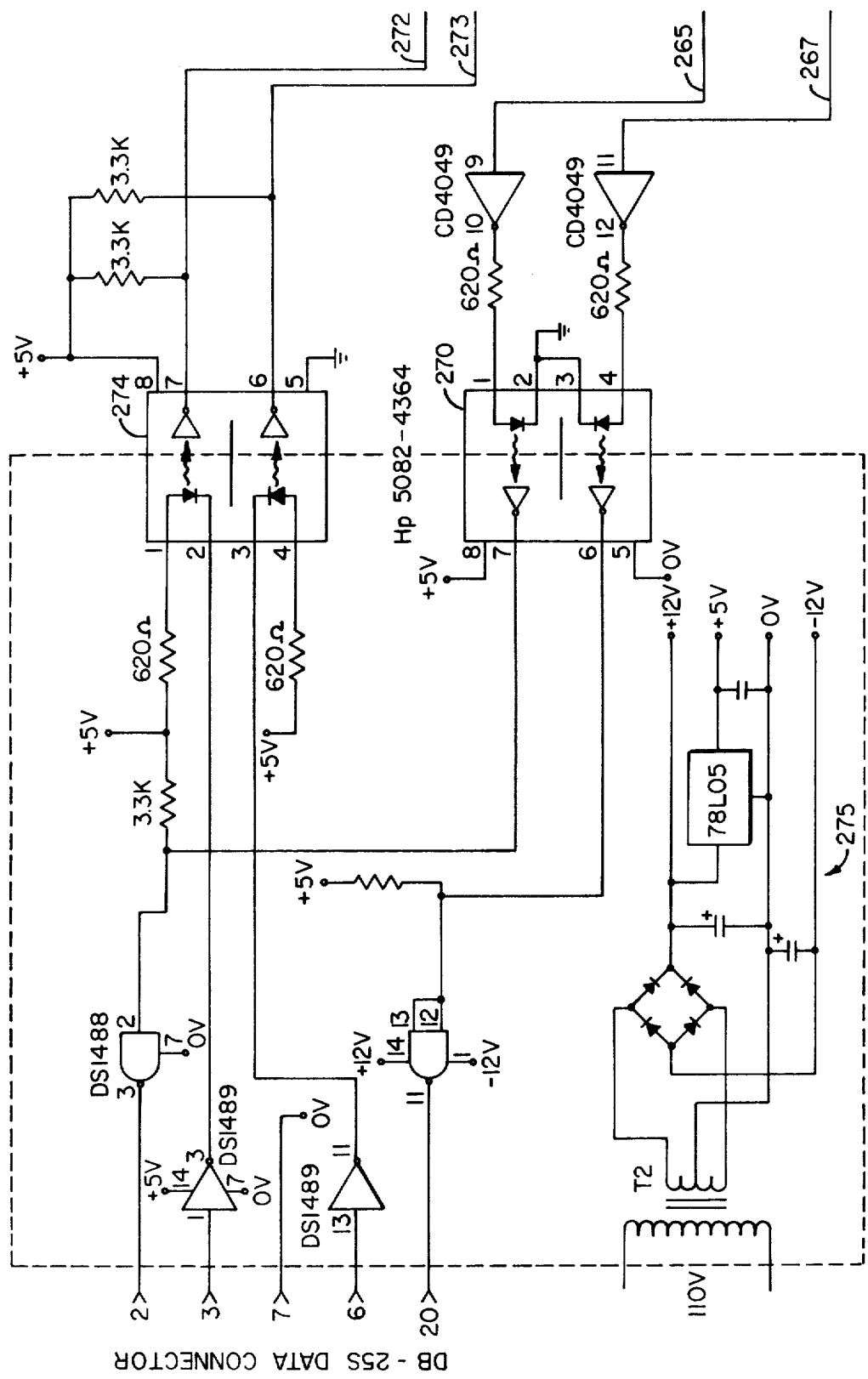
FIG._7A.

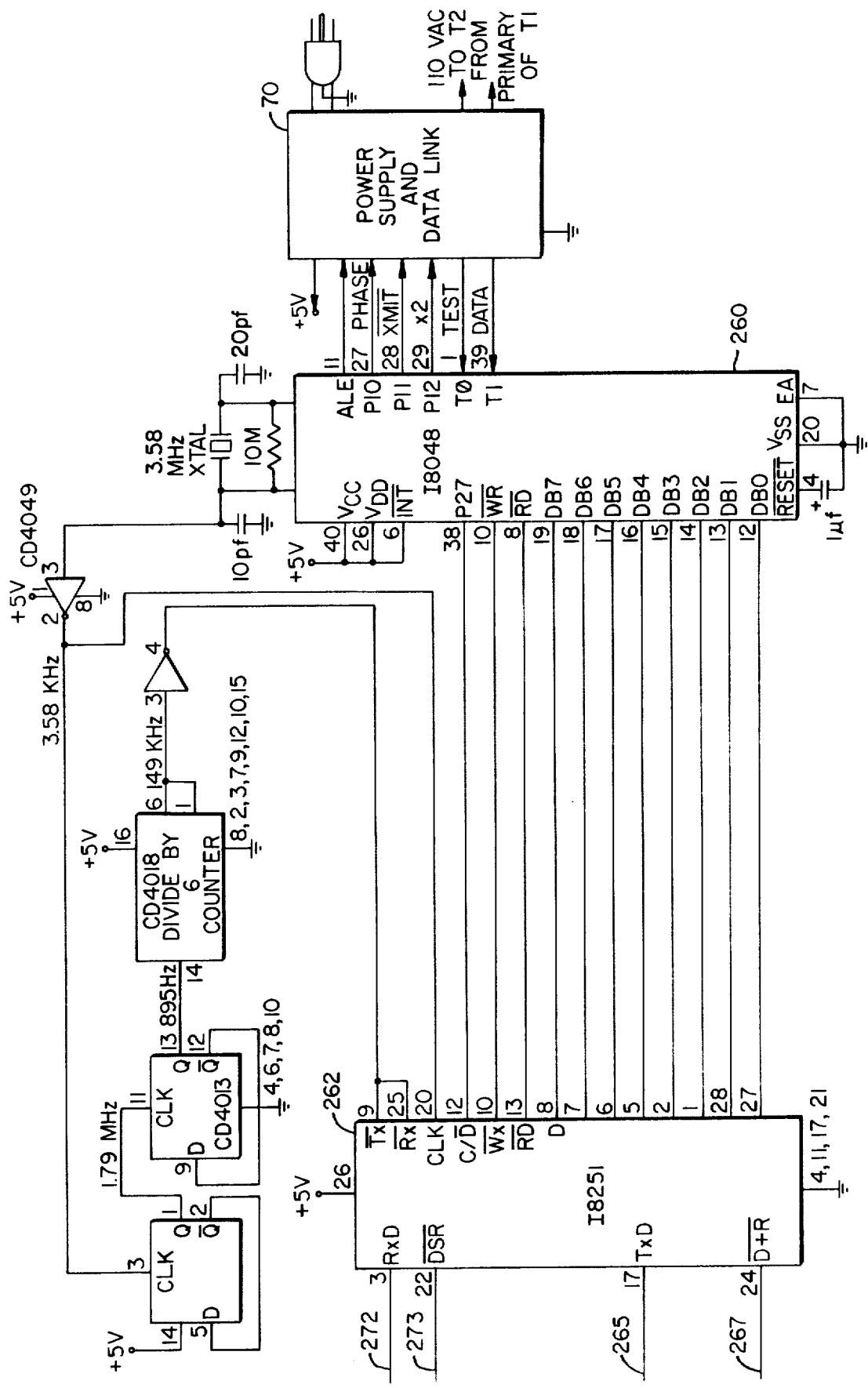
FIG._7B.

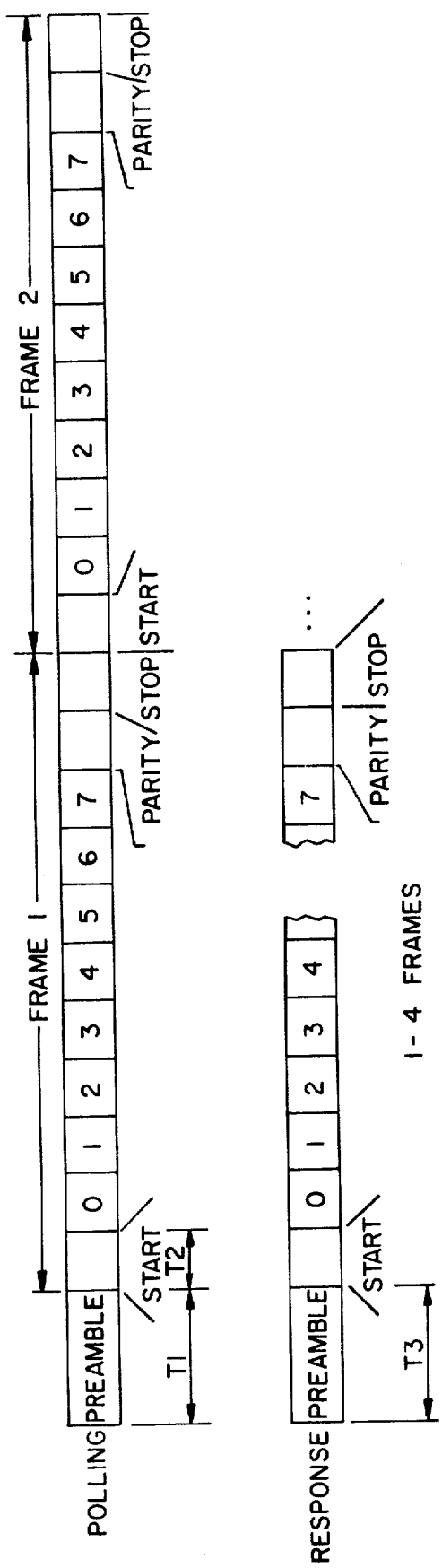
FIG._8.

CASH FLOW MONITORING SYSTEM

BACKGROUND OF THE INVENTION

1. Field of the Invention

The present invention relates generally to computerized data communications systems, and more specifically to a computer system for monitoring a plurality of remote electrically operated devices such as slot machines wherein the data bus incorporates the electrical power lines supplying the remote devices.

2. Background of the Invention

A generation ago many computer experts were of the opinion that a handful of general purpose digital computers would satisfy all the computing needs of the United States (and presumably the world). Today we have hand-held programmable calculators and home computers, and the commercial and industrial use of a central computer to monitor and control a plurality of remote electrical devices has become commonplace. The remote devices may be geographically dispersed (e.g. computer terminals in vaarious cities), or may be relatively proximate one another in a single building (e.g. heating and ventilation controls). The common denominator is information transfer, regardless of whether the information is to be used for accounting, security, energy conservation, or some other purpose.

One known and commonly used way of transferring data is to encode the data bits as a series of phase shifts that are superimposed on a carrier signal. This technique, known as phase shift keying, is most often carried out by having the transmitter constantly sending the carrier signal so that the receiver can remain in constant synchronization. Needless to say, this cannot be done if two-way communication is to be carried out over the same telemetry lines. In such a case, separate clocks at the transmitter and receiver are maintained in constant synchronization during data transmission by means of a phase locked loop which derives its timing from the bit changes themselves. The use of a phase locked loop is less than optimal since it requires a considerable amount of critically designed circuitry and involves a significant amount of lockup time in order to synchronize the clocks. Moreover, when the environment is noisy, a spurious signal has the effect of throwing the phase locked loop out of lock so as to destroy the data, even if the spurious signal itself didn't represent a threat to data integrity.

Slot machines are but one example of devices whose operation is characterized by substantial cash flow and thus present accounting and security problems. In the context of a gambling casino, a large number of machines are located in a room which is accessible to the public at all times. Each machine is characterized by a payout ratio that is slightly less than one hundred percent so that on the average the casino retains a small share of the total money passing through the machines. Overall profitability depends on having a large number of slot machines operating twenty-four hours a day, seven days a week, so that the effects of statistical anomalies are eliminated and the small percentage retained by the casino is applied to a large base to provide a large positive cash flow increment.

Slot machines are, for the most part, relatively complex electromechanical devices. Even minor malfunctions can result in substantial changes in the payout ratio, thus rendering the machines non-profitable, or even worse, cash drains. In addition to malfunctions of an accidental sort, there are those malfunctions caused by intentional tampering with the machine mechanism. Such tampering methods and their manifestations are well known to those in the slot machine art, and all too well by those engaged in the larcenous activities. Given the large amounts of cash involved, small systematic cash diversion, typically too small to be detected by casino management, is nevertheless attractive to the would be wrongdoers.

Mindful of the desirability of remotely monitoring the cash flow characteristics of a plurality of slot machines, there have been proposed security and monitoring systems including a central computer in communication with individual sensor units within the slot machines. Data transfer occurs along dedicated telemetry lines, thus providing reasonably high data integrity.

Unfortunately, the use of dedicated telemetry lines has the significant disadvantage that providing such dedicated lines represents a significant expense. Moreover, if it is desired to retrofit a roomful of slot machines with such a security system, the installation of the data lines is intolerably disruptive. Aside from the fact that each machine is required to be inoperative for the installation of its sensor unit, the operation of large groups of machines must be suspended for considerable intervals while the telemetry lines are being installed. As mentioned above, slot machine profitability depends on the operation of the machines on a substantially continuous basis. Therefore, the cost of suspending operation of large numbers of machines for even several hours represents a substantial disincentive to retrofit the machines in the first place.

Consequently, in spite of the demonstrable need for remote slot machine monitoring systems, the costs involved in retrofitting a roomful of slot machines with such a system has tended to hinder the development and implementation of remote slot machine monitoring systems.

SUMMARY OF THE INVENTION

The present invention provides a computerized monitoring system which eliminates all down time for retrofitting except for the modest time required to provide each individual remote device with its own internal sensor unit. This is accomplished by incorporating the power lines that provide electrical power to the remote devices as the physical communications medium of a serial data bus for the computer system. A particular installation for slot machines is disclosed.

The computerized communications system comprises a central computer and a plurality of computrized sensor modules within the individual slot machines. The central computer and the individual sensor modules are capable of and include means for sending and receiving signals to and from one another, the significance of the signals to be described more fully below. The central computer and each of the sensor modules has associated with it a respective data link for coupling the respective signal generating and receiving means to the power distribution lines and for manipulating the signals to and from a form suitable for transmission on the power distribution lines. Phase shift keying is used wherein binary bits of data are represented as 180° phase shifts of the pulses in a carrier pulse train. A data transmission rate of approximately 15,000 baud with a carrier frequency of 120 kHz is typical.

Communication may occur between any two devices, but in the preferred embodiment, communication is initiated by the central computer which sequentially polls individual sensor modules within the slot machines on a regular cyclical basis. Each slot machine sensor module is assinged a serial number for identification purposes. The polling signal includes a preamble of pure carrier frequency, followed by the serial number of the device being polled, followed by the data (or instructions) defining the message content. Each data link has its own clock for generating a pulse train at a frequency very close to the common carrier frequency, and includes means for bringing its own carrier frequency pulse train approximately into a predetermined phase relationship with the carrier train that is appearing on the power lines. This is typically done by stepping the phase by 90° increments until the local clock is in proper phase. Thus, when the serial number portion of the message begins, all data links are synchronized with the carrier in order to be able to interpret the serial number. When the serial number is determined, each device ascertains whether the message is destined for it, and if so, receives and acts on the message.

Typically, the message from the main computer requests the transmission from the remote sensor of some data. If the transmission from the remote sensor occurs substantially immediately, the central computer is already synchronized with the sensor.

It is important to recognize the fact that the electrical power distribution lines represent an extremely noisy environment and thus an unlikely medium for messages where error free data transmission is a prerequisite. The noise on the electrical lines arises from the various devices drawing electrical power such as motors with arcing brushes and solid state control units characterized by extremely sharp changes in current conduction. While some potential sources of electrical inteference may be filtered, sharp pulses contain power at virtually all frequencies, and cannot be filtered.

Despite this seemingly grim situation, the time distribution of noise on the power lines is not random, but rather correlates with the phase of the 60 Hz line voltage. Consequently, there are significant periods during which electrical lines are relatively free of noise, the time interval after zero crossing typically being the cleanest.

In recognition of the noisy environment, the message formats are designed to achieve substantially error free data transfer. In particular, messages are kept short, and suitable parity checks and other error detection techniques are employed. If a reasonable probability of error is detected, the message is ignored completely rather than any attempt being made to reconstruct it. Thus, if the message was from the computer, the remote sensor does not answer, signifying to the central computer that an error occurred. If the error occurred in a message from a remote sensor, the central computer disregards the message and retransmits.

It should be noted that synchronization of the receiving data link clock with the transmitting data link clock occurs once only at the beginning of the message. Therefore, only spurious signals that represent a data error will be troublesome, the system being immune to noise whose only effect would be to destroy the synchronization. Moreover, the nature of the synchronization process, involving only a decision as to whether or not to step the phase by 90°, allows synchronization to take place quickly. Thus, a high effective bit rate is achieved despite the short message format.

According to a further aspect of the present invention, each data link has means for changing (for example, halving) the carrier frequency if it is determined that messages at the original frequency are not getting through without error. This capability lowers the probability that data transmission is totally interfered with.

Each sensor module has a sensor/interface which provides signals to monitor the significant events in the slot machine operation, such as the receipt of coins, the turning of the reels, the payout of coins, and the opening of the slot machine door. A typical machine generates 50 volt AC signals for energizing the payout motor and for incrementing electromechanical counters that keep track of coin destinations and the like. The sensor/interface provides signals corresponding to the AC signals in the machine, signals indicative of the coin path followed by a coin, signals representative of the movement and timing of the reels, and a signal representative of the position of the door. In order to ensure slot machine integrity, no mechanical connection is made to the working mechanical components of the machine and electrical connections are kept to a minimum.

The electromechanical signals regarding the state of the slot machine are monitored by a plurality of opto/isolators assemblies. While an electrical connection is made to sense the electrical signals originating in the machine, the connection is one-way; while the sensor module can respond to the AC signals, it cannot influence them. The passage of a coin through the machine is monitored by a plurality of optical interruption detector assemblies placed at locations to detect a coin coming into the machine, a coin being paid out, a coin entering the safe, and a coin entering the hopper. These optical interruption detector assemblies also serve to verify the proper functioning of the slot machines own electromechanical counters. The motion of the reels is monitored by a plurality of reflected light sensors which change their respective states as alternating dark and light portions on the reels pass by. An additional reflected light sensor is mounted proximate the door of the slot machine and cooperates with a reflective target mounted on the door to provide a signal that is representative of the distance between the sensor and the reflective target. This signal, in the form of a voltage, is communicated through a voltage controlled oscillator, so that by monitoring the frequency of the signal from the voltage controlled oscillator, it is possible to verify that the door is indeed closed, or that the door is opened under proper authorization.

For a further understanding of the nature and advantages of the present invention, reference should be made to the remaining portions of this application and the attached drawings.

BRIEF DESCRIPTION OF THE DRAWINGS

FIG. 1 is a simplified electrical schematic for the power distribution system in a hypothetical casino;

FIG. 2 is a block diagram of the communication system utilizing the electrical power distribution lines;

FIG. 3 is a block diagram of the data link associated with one of the slot machines;

FIGS. 4A and 4B, taken together, form a circuit schematic of the microprocessor and data link;

FIGS. 5A and 5B, taken together, form a circuit schematic of the slot machine sensor and interface;

FIG. 6 is a schematic of alternate reel monitoring circuitry;

FIGS. 7A and 7B, taken together, form a circuit schematic of the communications processor; and FIG. 8 is a diagram illustrating the system message format.

DETAILED DESCRIPTION OF THE INVENTION

Overview

Broadly, the present invention provides a computerized monitoring system which uses the power lines that provide electrical power to the monitored devices as the physical data communications medium of the computer data bus. For definiteness, the description that follows will be with reference to monitoring a plurality of slot machines in a casino. In order to implement the system of the present invention, it is often necessary to make minor modifications to the power distribution wiring within the casino in order to provide a continuous signal path.

FIG. 1 is a schematic block diagram showing a typical power distribution system for a hypothetical casino. As will be described below, the data is transmitted at frequencies greatly in excess of the 60 Hz at which AC power is supplied. For example, a data rate of 10 kHz (10,000 baud) superimposed on a carrier frequency in the range of 50-200 kHz is typical. The important elements of the system include a central computer system 10 and a plurality of specially outfitted slot machines 12. For definiteness, assume that a first group 15 of slot machines, all of which operate on 110 volts, is located on the ground floor of the casino; and that a second group 17, a first subgroup 18 of which operates on 220 volts and a second subgroup 19 of which operates on 110 volts, is located on the mezzanine floor of the casino. Further, assume that computer system 10, ground floor slot machines 15, and mezzanine slot machines 17 are powered from respective isolated secondary windings 20, 22, and 25 of a main transformer 27. Power from the transformer secondaries is communicated to respective electrical panels 30, 32, and 35 which typically provide circuit breakers for individual circuits served by that panel. A stepdown transformer 36 is provided between panel 25 and slot machine subgroup 19.

It is immediately apparent that the power lines do not provide a suitable communication medium when isolated transformer secondaries are used. To overcome this, coupling capacitors are installed to provide a continuous current path for high frequency signals. In particular, coupling capacitors 37 are installed between corresponding terminals of primaries 20 and 22, and coupling capacitors 40 are installed between corresponding terminals of secondaries 22 and 25. Additionally, coupling capacitors 42 are installed across the circuit breakers in computer room breaker panel 30 and across any other breakers where it is desired to keep the communication lines open in the event of a breaker opening. Also, since power to slot machine subgroup 19 is stepped down from 220 volts to 110 volts, capacitors 45 are connected between corresponding primary and secondary terminals of transformer 20. The value of the capacitors is not critical; 0.1 microfarad bidirectional capacitors rated at 1200 volts are suitable.

With the electrical power distribution system for the casino thus modified by the addition of coupling capacitors, the entire power distribution system may be treated as electrically continuous for the purposes of the discussion that follows. FIG. 2 is a block diagram showing central computer system 10 and several specially outfitted slot machines 12 connected to a common power line 60, which for purposes of electrical signals at high frequencies, may be considered a continuous two-conductor line. Central computer system 10 includes a mini-computer 65 which receives its electrical power from line 60, a communications processor 67, and a central computer data link 70 that is coupled to power line 60 by suitable capacitors 72. Communications processor 67 transfers data between mini-computer 65 and central computer data link 70. Each slot machine 12 includes the slot machine proper, designated by reference numeral 75, and a sensor subassembly 80 which includes a sensor/interface 82, a microcomputer 85, and a slot machine data link 87. Slot machine data link 87 is coupled to power distribution line 60 by capacitors 90. Each slot machine data link 87 is substantially the same as central computer data link 70.

Data Link

FIG. 3 is a block diagram illustrating the basic elements of data link 87 and its interaction with microprocessor 85. It should be understood that electronic components in data link 87, microcomputer 85, and sensor/interface 82 derive their electrical power from power supply circuitry 91 coupled to power distribution line 60. Broadly, phase shift keying is used to superimpose binary bits on a carrier (clock) frequency in the range of 50-200 (60 or 120 kHz being preferred) kHz with bit changes being signified by a 180° phase shift from the basic carrier. Data link 87 includes clock circuitry 92, transmitting circuitry 93, receiving circuitry 94, and phase comparison circuitry 95. The clock frequency is supplied to transmitting circuitry 93 on a line 96 and to phase comparison circuitry 95 on a line 97 by clock circuitry 92 which receives a 240 kHz square wave from an ALE output 100 of microprocessor 85. Microprocessor 85 is driven by a local crystal oscillator 101 which ultimately defines the ALE output. A data output 102 of microprocessor 85, designated PHASE, controls the phase of clock 92.

Consider first transmitting data circuitry 93. The clock pulses on line 96 are transmitted to gate circuitry 104 which is controlled by a further data output 105 of microprocessor 85, designated $\overline{\text{XMIT}}$. The gate output is passed to driving circuitry 111 and a low pass filter 112 to produce a sine wave on a data output line 113 at the carrier frequency and in constant phase relationship with the clock phase on line 96. This signal is capacitively coupled to power line 60 by capacitors 90 as described above.

With reference to the circuit schematic of FIG. 4A, the operation of data link 87 during data transmission may be understood. Clock circuitry 92 includes flip-flops 120 and 122, each of which provides a frequency division by a factor of 2. A 2-to-1 multiplexer 123 is controlled by a line 124, designated X2, so that flip-flop 120 may be selectively bypassed to avoid one of the frequency divisions. As can be seen, line 96 is in fact a pair of complementary output lines from the $\overline{Q}$ and $\overline{Q}$ outputs of flip-flop 122 while line 97 is coupled to the Q output only. An Exclusive OR (XOR) gate 125 is interposed between the flip-flops, and has one of its inputs controlled by PHASE output 102. Flip-flop 122 is triggered by a rising edge with the result that each transition at PHASE output 102 causes a 90° phase shift on lines 96 and 97. $\overline{\text{XMIT}}$ output 105 is also coupled to PHASE output 102 through a 10K resistor 127. Microprocessor 85 has an internal 50K pullup resistor on PHASE output 102, so that a low level at $\overline{\text{XMIT}}$ output 105 actually holds PHASE output 102 low. When microprocessor 85 specifies a high level at output 102, it sends a short high pulse which it expects would keep output 102 high. The result is that PHASE output 102 goes high and is quickly pulled low by $\overline{\text{XMIT}}$ output 105. Thus, with $\overline{\text{XMIT}}$ output 105 low, an instruction to set PHASE output 102 high results in an upward and a downward transition at that output which causes a 180° phase change at the outputs of flip-flop 122.

The output lines of flip-flop 122 that define line 96 are coupled to first inputs of respective AND gates 130 and 132 within gate circuitry 104. The second inputs are controlled by $\overline{\text{XMIT}}$ output 105 so that the output ultimately is controlled by the level on $\overline{\text{XMIT}}$ output 105. Driving circuitry 111 includes driving transistors in a push/pull configuration to produce a square wave that replicates the Q output from flip-flop 122. Unless $\overline{\text{XMIT}}$ ouput 105 is low, no pulses are produced by driver 111. Low pass filter 112 is typically a 200 kHz low pass filter. The square wave from driver 111 is then filtered to suppress radiofrequency signals and capacitively coupled to line 60, with the resulting sine wave being communicated to all the other data links in the system.

Before discussing receiving circuitry 94, it is important to recognize that data reception depends on the receiving data link clock's being initially generally in phase, or 180° out of phase, with the transmitting data link clock so that 180° phase shifts can be recognized. Since the individual ALE outputs of the microprocessors are controlled ultimately by individual local crystal oscillators, there is no guarantee that any two data link clocks will be in any particular phase relationship at a given time. However, the crystals are sufficiently uniform that once a given phase relationship between two of the clocks is established, the relationship persists for a sufficiently long time to permit data transmission. Accordingly, there is also provided means for synchronizing the receiving data link clock to the transmitting data link clock, as will now be described.

Incoming signals on power line 60 are passed by coupling capacitor 90 to a data input line 138 and transmitted to receiving circuitry 94 which includes a high pass filter 140, limiting circuitry 142, and suitable amplification circuitry 145 to provide a square wave at the carrier frequency and in constant phase relationship with the incoming signal. The square wave is fed to the first input of an XOR gate 150, the other input of which receives the clock signal from locally controlled clock 92 on line 97. The output of XOR gate 150 depends on the relative phase between the two signals. The nature of an XOR gate is such that the output is a pulse train at twice the carrier frequency with the duty cycle (fraction of time high) varying linearly from 0 to 1 as the phase difference varies from 0 to ±180°. In particular, if the two signals are precisely in phase, a uniform low level is output; if out of phase, a uniform high level is output. If the signals are 90° out of phase, a square wave at twice the carrier frequency is at the output. The output is passed through a low pass filter 152 in order to produce a level that is directly representative of the duty cycle and hence the phase difference.

Notice that a phase difference of ±90° is unsuitable for data recognition, since a 180° phase shift of the incoming data results in a phase difference of ±90°, which produces the same level at the output of low pass filter 152 and is thus indistinguishable. Accordingly, to determine whether the level from low pass filter 152 is sufficiently high or low to make phase shifts of 180° recognizable, the level is passed to discriminator circuitry 160 that applies a level test and a so-called strict test and provides two output signals that are communicated to respective test inputs 162 and 165 of microprocessor 85. The level at input 162 is high or low depending on the output from low pass filter 152 while the level at input 165 indicates whether the level from low pass filter 152 is sufficiently far removed from the halfway level that 180° phase shifts are reliably recognizable. If it is determined that the phase difference between the incoming signal and the receiving data link clock is generally near ±90°, microprocessor 85 steps the phase by 90°.

With additional reference to the circuit schematic of FIGS. 4A and 4B, the operation of data link 87 during reception may now be understood. In particular, during reception, $\overline{\text{XMIT}}$ output 105 is held high, so that when microprocessor 85 commands a high level at PHASE output 102, the level stays high. Thus, with $\overline{\text{XMIT}}$ output 105 high, PHASE output 102 may be set high or low to induce single transitions causing 90° phase shifts in the output from clock 92. Low pass filter 152 is preferably a second order active low pass filter with the component parameters chosen to define a corner frequency $\frac{3}{8}$ the baud rate with 6 db/octave attenuation above the corner. This suitably eliminates vestiges of signals at or above the carrier frequency which, as discussed above, is typically 8 to 10 times the baud rate. Discriminator circuitry 160 includes a center thresholder 167 with 10% hysteresis to feed test input 162 for the level test, and a window comparator 170 with comparison points at one-third and two-thirds the voltage to feed test input 165 for the strict test. The status of test inputs 162 and 165 may be rapidly checked by microprocessor 85.

It should be noted that the output from low pass filter 152 will also be at the halfway level when there is no incoming signal at the carrier frquency, that is when there is random noise on power line 60, and will remain at that level despite 90° steps in the clock output. Thus, each data link can, when desired, "listen" for signals at the carrier frequency by periodically stepping the clock phase by 90° to see if the output from low pass filter 152 passes the strict test. Once a signal at the carrier frequency is found, shifts in the level from low pass filter 152 denote shifts in the binary bits.

Slot Machine Sensor/Interface

As should be apparent from the above description of the data link, the operation does not depend on the particular nature of the data that microcomputer 85 receives from its remote device (slot machine). However, for definiteness, a preferred embodiment of sensor/interface 82 for a slot machine will be disclosed.

Before describing the sensor/interface, it is helpful to consider some basic principles of operation of a typical electromechanical slot machine. As is well known, a slot machine has a plurality of coaxil adjacent reels, each having a plurality of pictorial symbols on its cylindrical surface. An operator places one or more coins in a slot, and pulls a handle. This causes the reels to turn independently of one another, and depending on the configuration of aligned symbols when the reels stop, coins may be paid out in varying amounts. The significant events in the slot machine operation are the receipt of coins, the turning of the reels, the payout of coins, and the opening of the slot machine door which allows casino personnel to gain access to the machine's interior. From an accounting and security point of view, useful information can be gained by suitable monitoring of the machine with respect to any and all of these events.

Upon insertion of a coin into the slot machine, a mechanical sorter makes an initial determination that the coin is an acceptable coin of a particular denomination. The downward passage of the coin then actuates a microswitch to initiate the machine cycle. The coin then falls into a hopper where it is available for payout, or, if the hopper is full, into a safe at the bottom of the machine where it is no longer available for payout. A typical machine generates 50 volt AC signals for energizing the payout motor and for incrementing electromechanical counters that keep track of information such as the number of coins accepted, the number of coins entering the hopper, and the like.

FIGS. 5A and 5B, taken together, form a circuit schematic of sensor/interface 82. Broadly, the sensor/interface provides signals corresponding to the AC signals in the machine, signals indicative of the coin path followed by a coin, signals representative of the movement and timing of the reels, and a signal representative of the position of the door. The general requirement to ensure slot machine integrity is that no mechanical connection be made to the working mechanical components of the machine and that electrical connections be kept to a minimum.

The electromechanical signals regarding the state of the slot machine are monitored by a plurality of opto/isolator assemblies 180. Each opto/isolator assembly includes an opto/isoltor 182, itself comprising a light emitting diode (LED) 182a and a phototransistor 182b, and a thresholder 185. LED 182a is energized by the presence of 50 volt, 60 cycle signals within the machine and turns phototransistor 182b on to provide an electrical signal which is passed through thresholder 185 to an appropriate data input of microcomputer 85. It should be noted that while an electrical connection is made to sense the electrical signals for the payout motor and the electromechanical counters, there is no direct electrical connection between the source of the AC signals and the computer electronics. Moreover, the connection is one-way; while microcomputer 85 can respond to the AC signals, it cannot influence them. In a particular embodiment, there are four opto/isolator assemblies 180 that are coupled to respective sources of signals representing a coin coming into the machine, a coin being paid out of the machine, a coin going into the safe, and the payout motor's being energized.

The passage of a coin through the machine is monitored by a plurality of optical interruption detector assemblies 190. Each optical interruption detector assembly 190 includes a an LED 192 on a first side of the expected coin path, a cooperating phototransistor 195 on the opposite side, and a thresholder 197. The passage of a coin between LED 192 and phototransistor 195 causes an electrical pulse which is communicated through thresholder 197 to an appropriate data input of microcomputer 85. According to a particular embodiment, there are four such optical interruption detector assemblies, placed at locations to detect a coin coming into the machine, a coin being paid out, a coin entering the safe, and a coin entering the hopper. It will be appreciated that optical interruption detector assemblies 190 serve to also verify the proper functioning of the electromechanical counters. With respect to the coin entering the machine, it is preferable to have the particular optical interruption detector assembly 190 proximate the microswitch which initiates the machine cycle so that microcomputer 85 can detect an attempt to repeatedly actuate the microswitch with a coin on a string.

The motion of the reels, fragmentary portions being designated 199, is monitored by a plurality of individual reel motion detectors 200, each of which comprises a reflected light sensor 202 and a thresholder 205. Sensor 202 changes its state as alternating dark and light portions on the reels pass by, and the change in state is electrically communicated through thresholder 205 to an appropriate date input of microcomputer 85. In the particular embodiment, for a slot machine having three reels, there are three such reel motion detectors. An additional reflected light sensor 210 is mounted proximate the door of the slot machine and cooperates with a reflective target 212 mounted on the door to provide a signal that is representative of the distance between sensor 210 and reflective target 212. Sensor 210 provides a precise reading of door position over the last centimeter or so of door travel prior to the door's closing. This signal, in the form of a voltage, is communicated through a voltage controlled oscillator 215 to microcomputer 85. Microcomputer 85 can monitor the frequency of the signal from voltage controlled oscillator 215 in order to verify that the door is indeed closed, or that the door is opened under proper authorization.

In order for microcomputer 85 to properly respond to system messages being communicated over power line 60, and in order for the microcomputer to properly monitor the slot machine functioning, it is necessary to have access to information unique to its own particular slot machine. In addition to an identification number for the slot machine, there are timing parameters and other quantities that are characteristic of that machine and vary from one machine to another. This information is preferably stored in a separate memory chip 220, designated a slot machine memory. Slot machine memory 220 must be non-volatile so that the appropriate parameters are not lost during a power interruption. If it is desired to also maintain long term registers (such as total number of cycles that the slot machine has undergone), it is necessary that memory locations within slot machine memory 220 be capable of being updated. These requirements are met by using a CMOS RAM for slot machine memory 220, and providing a battery 211 for backup when normal power is absent. The address information is latched at memory address latches 222 on the falling edge of the ALE signal. Address and data are transmitted on microcomputer data bus 223 in a time multiplexed fashion.

In the circuitry described with reference to FIGS. 5A and 5B, alternating changes in state of reflected light sensors 202 signify the movement of reels 199, and thus give information on reel velocity. However, many slot machines have the property that the reel may move backwards by one position before finally stopping, thus rendering it difficult to reliably monitor the precise position of the reel. FIG. 6 is a circuit schematic of alternate reel monitoring circuitry capable of monitoring the reel's position as well as its velocity, being suitable for use where the reels are characterized by unidirectional rotation. While only one reel's associated circuitry is shown, the identical circuitry is provided for each of reels 199. Each of reels 199 is provided with marker such as a contrasting dot 225 at a predetermined position, preferably near an edge of the cylindrical surface of reel 199. The basic purpose of the circuitry is to use dot 225 as a reference and to count the number of symbols passing after the dot in order to gain a precise indication of the reel position.

Associated with reel 199 is a first reflected light sensor 227 (comprising an LED 227a and a phototransistor 227b) directed toward the symbols on the reel, and a second reflected light sensor 230 (comprising an LED 230a and a phototransistor 230b) directed toward the axial portion of the reel where dot 225 is located. An oscillator circuit 232, which may comprise a timer and appropriate passive components, energizes LEDs 227a and 228a at a predetermined frequency, preferably 700 Hz. Thus, as the alternating dark and light portions corresponding to pictorial symbols on reel 199 pass reflected sight sensor 227, a 700 Hz signal is intermittently generated at phototransistor 227b during the periods that light is being reflected. The signals from phototransistor 227b are passed through 700 Hz band pass circuitry 235, and thence to 700 Hz detection circuitry 240. Circuitry 235 is characterized by a gain of 5 and Q value of 3 to amplify and filter the signals in order to provide a clean 700 Hz signal during those intervals when light is being reflected. Detection circuitry 240, tuned to the same 700 Hz frequency provides an output signal pulse for each picture that goes by sensor 227. These pulses are passed to a 5-bit counter 245 whih provides a numeric representation of the position of reel 199.

Phototransistor 228b provides a 700 Hz signal during those portions of the rotation of the reel that light is being reflected. Therefore, assuming that the reel is light colored with a dark dot, the signal is present except when dot 25 passes. The signal from phototransistor 228b is passed through corresponding band pass and gain circuitry 247 and then through a 700 Hz detector 250, the output of which is communicated to the reset input of counter 245. Therefore, during the rotation of reel 199, counter 245 is reset the first time that dot 225 passes under reflected sensor 228 and upon every subsequent passage thereafter. Since the motion of reel 199 is unidirectional, the output of counter 245 gives a true representative of the reel position. The output of counter 245 is communicated to appropriate lines of data bus 221. The corresponding counters for the other reels are similarly coupled to the data bus, and microcomputer 85 can select which reel's counter contents are to be strobed onto the data bus at a particular moment.

Communications Processor

Just as each slot machine data link 87 communicates to its respective slot machine 75 through a slot machine microcomputer 85 and a sensor/interface 82, similarly central computer data link 70 communicates to central minicomputer 65 through communications processor 67. FIG. 7 is a simplified circuit schematic of communications processor 67.

Broadly, communications processor fulfills two main functions. The first is reconfiguring the data between the format for transmission onto or reception from the power lines and the format for central minicomputer 65. The second function is bidirectional voltage isolation.

Communication processor 67 comprises a microprocesor 260 which is coupled to central computer data link 70 in the same manner that microcomputer 85 is coupled to slot machine data link 87. Microprocessor 260 communicates to a universal synchronous/asynchronous receiver and transmitter (hereinafter USART) 262. USART 262 transmits signals on lines 265 and 267 to the LED (input) side of an opto/isolator 270, and receives signals on lines 272 and 273 from the phototransistor (output) side of an opto/isolator 274. Data link 70, microprocessor 260, and USART 262 receive their electrical power from a common power supply and the signals are TTL compatible. Signals at the phototransistor side of opto/isolator 270 and at the LED side of opto/isolator 274 are communicated to minicomputer 65 at 19,200 baud. A separate power supply 275 provides +12 volt, +5 volt, 0 volt, and −12 volt levels so that the signals are EIA spec RS-232 compatible.

System Message Format

A standard communication between central minicomputer 65 and one of slot machines 12 occurs between communications processor microprocessor 260 and microcomputer 85 with the transmitted data being applied to and extracted from power line 60 by central computer data link 70 and slot machine data link 87. For the system described above, such a standard message includes an initial message from the central computer and a response from the slot machine. During system operation, microcomputer 85 is essentially doing two things. First, it is monitoring the various signals from sensor/interface 82 and updating various of its own counters and status registers (to be described below). Second, and simultaneously, it is carrying out a communications protocol with the rest of the system. The slot machine monitoring is carried out at a standard program level while the system communications is carried out an interrupt level of the microprocessor.

Turning to FIG. 8, the standard message format is graphically depicted. The polling message from central minicomputer 65 (actually microprocessor 260 via data link 70) begins with a preamble of pure carrier frequency to enable each microcomputer 85 to get synchronized with the carrier frequency in order that the subsequently transmitted message can be successfully demodulated. The preamble has a duration, designated T1, that is typically 4–12 standard bit times, depending on transfer characteristics. The standard bit time, designated T2, is determined by the baud rate and may be approximately 1/30,000th to 1/10,000th of a second.

The message content is included in two frames, each having 11 bits, namely a start bit, 8 bits of data, an odd parity bit, and a stop bit. The start bit is defined by a 180° phase shift relative to the preamble and is defined to be a data '0'. Subsequent bit changes are signified by further 180° phase shifts. The stop bit is defined to be a data '1'. The first frame includes data bits 0–7 while the second frame includes data bits 8–15. Data bits 0–11 form a 12-bit address while data bits 12–15 define a 4-bit command code, thus providing for 16 possible commands.

The response begins with a preamble of pure carrier frequency having a duration, designated T3, that is approximtely 2 standard bit times. This preamble is not required for synchronization (since the response occurs substantially immediately after the polling message), but rather serves to define the start of the first response frame. Depending on the nature of the polling message, the total response may be 1–4 frames in length, each frame of which has 11 bits as in the polling message.

In order to allow microcomputer 85 the maximum length of uninterrupted time for monitoring the slot machine operation, communications from the central computer are caused to occur in a predictable time slot at a constant repetition rate. In particular, the time slot is sufficiently long to accommodate the preamble, the two frames of message, and up to four frames of response. The interval between the start of the preamble on subsequent polls is a system constant. An internal timer in microcomputer 85 generates an interrupt that signifies that it is time to receive a message from communications processor 67, at which time, data link 87 hunts for the preamble at the carrier frequency and synchronizes as described above so that the message may be received. This occurs in each sensor module.

On start up of a particular sensor module, in order that the time slots may be established, microcomputer 85 and data link 87 must constantly search for carrier frequency by periodically stepping the clock phase by 90° as described above. Once the preamble at the carrier frequency is detected, the microcomputer uses its very accurate internal timer and sets it to a quantity such that it will be interrupted by its own timer at exactly the time of the start of the next preamble. As long as microcomputer 85 remains powered, it will stay in basic synchronization by starting its timer again from when it receives the stop bit at the end of frame 2 of the message from the communications processor. The communications processor must do an analogous timing so that it sends out preamble at this specified rate to be followed by commands that it is ordered to send by central minicomputer 65.

Thus it can be seen that synchronization takes place at two levels. First, on powering up of any particular one of remote microcomputers 85, that microcomputer's internal timer is synchronized with the polling messages that are being transmitted at fixed intervals from communications processor 67. Second, on each polling, a signal at the carrier frequency must be found and the clock synchronized in order to receive data.

At the non-interrupt level, microcomputer 85 is constantly monitoring the signals from sensor/interface 82 in order to ascertain the status of slot machine 75. Most of the time is spent awaiting a signal from the "coin in" sensor to indicate that a coin has been dropped into the machine. When this happens, microcomputer 85 updates the appropriate counters and waits for another coin to be inserted or for the slot machine handle to be pulled and the reels to start spinning. Once this has occurred, microcomputer 85 goes into the next phase of the cycle and waits for the reels to stop, checks their timing, and checks for payout, if there any.

Turning next to the particular commands and responses, it should be understood that the following is an illustrative format. For security reasons, the particular significance of the bits is likely to be different from one casino to the next, and furthermore is likely to be changed at periodic intervals to discourage any attempt for unauthorized personnel to gain meaningful access to the data.

The 16 command codes and the length of the expected response for each are shown in Table 1. It should be recalled that up to four frames (32 bits) may be accommodated.

TABLE 1

| TYPE | BITS 15 | 14 | 13 | 12 | COMMAND | RESPONSE (BITS) |
|---|---|---|---|---|---|---|
| 0 | 0 | 0 | 0 | 0 | Group Poll | 1 (2 bit times) for |

TABLE 1-continued

| TYPE | BITS 15 | 14 | 13 | 12 | COMMAND | RESPONSE (BITS) |
|---|---|---|---|---|---|---|
|  |  |  |  |  |  | each of 16 machines |
| 1 | 0 | 0 | 0 | 1 | Report Status | 8 |
| 2 | 0 | 0 | 1 | 0 | Report Cycle Phase Code | 8 |
| 3 | 0 | 0 | 1 | 1 | Report Error Code | 8 |
| 4 | 0 | 1 | 0 | 0 | Return Cycle No. | 24 |
| 5 | 0 | 1 | 0 | 1 | Return No. of Coins In | 24 |
| 6 | 0 | 1 | 1 | 0 | Return No. of Coins Out | 24 |
| 7 | 0 | 1 | 1 | 1 | Return No. of Coins in Hopper | 24 |
| 8 | 1 | 0 | 0 | 0 | Return No. of Coins in Safe | 24 |
| 9 | 1 | 0 | 0 | 1 | Return No. of Coins on Last Payout | 16 |
| 10 | 1 | 0 | 1 | 0 | Return Last Payout Code | 16 |
| 11 | 1 | 0 | 1 | 1 | Return Data Check Code | 24 |
| 12 | 1 | 1 | 0 | 0 | Switch to Alternate Frequency & Return Status | 8 |
| 13 | 1 | 1 | 0 | 1 | Clear Error Code & Return Status | 8 |
| 14 | 1 | 1 | 1 | 0 | Return Cycle No. of Last Error | 24 |
| 15 | 1 | 1 | 1 | 1 | Return Check Code for Last Message | 8 |

Elaborating on the above, the individual commands will now be considered.

Command type 0 is a group poll wherein groups of machines are polled to quickly see if any machines have data to transmit. The expected response is one bit for each member of a polled group of 16 slot machines, although the response for a given slot machine actually extends over two bit times. In particular, carrier frequency in phase with the signal during the stop bit is sent for the first bit time and then a 180° phase shift is introduced if there is a message to transmit. After polling in this fashion, the central computer can individually poll those machines with data to report.

Command type 1 requests the return of an 8-bit status register. The particular significance of the status register bits is shown in Table 2 wherein a designated occurrence is signified by that bit's being at '1'.

TABLE 2

| Status Bit |  |
|---|---|
| 0 |  |
| 1 |  |
| 2 |  |
| 3 | Jack Pot |
| 4 | Cycle in Progress |
| 5 | Error Condition |
| 6 | Door Open |
| 7 | Event to Report |

Command type 2 request the return of an 8 bit cycle phase code register. Various slot machines are set up so they can take some number of coins on a particular cycle prior to the handle's being pulled. Bits 0–3 are coded to indicate the number of coins that have been accepted while bits 4–7 are coded to indicate what part of the cycle the slot machine is currently in. The particular bit allocation and cycle phase codes are shown in Table 3.

TABLE 3

Cycle Phase Code

| Bit | | | | | |
|---|---|---|---|---|---|
| 0 | } No. of Coins Input This Cycle | | | | |
| 1 | | | | | |
| 2 | | | | | |
| 3 | | | | | |
| 4 | | | | | |
| 5 | } | Cycle Phase | | | |
| 6 | } | 7 | 6 | 5 | 4 |
| 7 | } | 0 | 0 | 0 | 0 | Waiting for Coin |
| | | 0 | 0 | 0 | 1 | Coin(s) Accepted |
| | | 0 | 0 | 1 | 0 | Reels Spinning |
| | | 0 | 0 | 1 | 1 | Payout Cycle |
| | | 0 | 1 | 0 | 0 | Halt on Jackpot |
| | | 0 | 1 | 0 | 1 | Halt on Hopper Empty |
| | | 0 | 1 | 1 | 0 | Disabled by Operator |
| | | 0 | 1 | 1 | 1 | Hopper Fill in Progress |

Command type 3 requests the return of an 8-bit error code. The type of error codes can be representative of states arising out of equipment failure, normally occurring events, or intentional attempts to defraud the machine. Typical situations for the latter are if the machine timing is changed due to someone's having drilled a small hole in the machine and inserted a wire to affect the governor or other movement of the wheel, or if the machine has been subjected to a large magnetic field to affect the operation.

TABLE 4

| Error Code Bit | |
|---|---|
| 0 | Sensor Failure |
| 1 | Hopper Empty |
| 2 | Coin Path Error |
| 3 | Incorrect Payout |
| 4 | Payout Turn-on Out of Sequence |
| 5 | Magnetic Tamper |
| 6 | Timing Tamper |
| 7 | Coin Input Tamper |

Command type 4 requests the return of a 24-bit counter representative of the number of cycles the machine has undergone.

Command type 5 requests the return of a 24-bit counter representative of the number of coins that have been put into the machine.

Command type 6 requests the return of a 24-bit counter representative of the number of coins that have been paid out in the past.

Command type 7 requests the return of a 24-bit counter representative of the number of coins that have gone into the hopper.

Command type 8 is requests the return of a 24-bit counter representative of the number of coins that have gone into the safe.

Command type 9 requests the return of a 16-bit counter representative of the number of coins that were paid out on the last cycle.

Command type 10 requests the return of the last payout code which is a 16-bit number that contains coded information regarding what combination came up on the reels and is used to verify that a particular machine has come up with a winning combination when it starts to pay.

Command type 11 requests the return of a 24-bit data check code which is the sum of the number of coins in, the number of coins out, the number of coins in the hopper, and the number of coins in the safe. It is used to detect that one of these quantities changed since the last time the machine was interrogated.

Command type 12 instructs microcomputer 85 to select the alternate carrier frequency from whenever it may be at the time, and, when it gets to that other carrier frequency, to return the status register.

Command type 13 instructs microcomputer 85 to clear the error code and return the status, but this will only occur if the previous command to the particular microcomputer was a type 3 command to return the error code. Otherwise the response to the command is merely to return the status register but not to clear the error code.

Command type 14 requests return of the 24-bit cycle number of the last cycle on which an error occurred.

Command type 15 requests that the return of an 8-bit check code for the last message. This is a checksum which is used to verify the accuracy of certain types of information that have been transferred. Microcomputer 85 takes the 8-bit data frames that were in the last message, sums up the individual frames, and comes up with an 8-bit two's complement number that is sent out as a response.

In summary it can be seen that the present invention provides a computerized monitoring and communications system that is characterized by simplicity and reliability while providing high data transfer rates under highly inhospitable conditions. While the above provides a full and complete disclosure of the preferred embodiments of the invention, various modifications, alternate constructions, and equivalents may be employed without departing from the true spirit and scope of the invention. For example, the system is clearly applicable to remote devices other than slot machines. Therefore, the above description and illustrations should not be construed as limiting the scope of the invention which is defined by the appended claims. I claim:

1. A system for monitoring the operation of a plurality of remote electrically operated devices, each of said devices receiving power from a common set of power distribution lines, comprising:

a central computer including signal generating means and signal receiving means;

central computer data link means coupling said central computer signal generating means and said central computer signal receiving means to said power distribution lines to permit said central computer to send signals over said power distribution lines and to receive signals over said power distribution lines;

said signals from said central computer having a time structure including a portion representative of a particular one of said remote devices with which communication is desired; and a corresponding plurality of subassemblies associated with said remote devices, each of said subassemblies comprising:

a sensor having signal receiving means responsive to said signals from said central computer and having signal generating means for generating signals representative of desired operation information, said sensor having means for transmitting said signals representative of operation information only in response to a signal from said central computer designating the particular device associated with that particular sensor;

sensor data link means coupling said sensor signal generating means and said sensor signal receiving means to said power distribution lines to permit said sensor to receive said signals from said central computer over said power distribution lines, and to permit said sensor to send said signals representative of operation information to said central computer over said power distribution lines to said central computer, said sensor data link means including a locally controlled clock for generating a first cyclical pulse train at a carrier frequency, said clock having a phase control input and means for stepping the phase of said first cyclical pulse train by predetermined increments in response to signals at said phase control input, transmitting means responsive to said first cyclical pulse train for applying a first sinusoidal signal to said power distribution lines, said first sinusoidal signal having said carrier frequency and being in a constant phase relationship with said first cyclical pulse train, receiving means responsive to a second sinusoidal signal generally at said carrier frequency appearing on said power distribution lines, said receiving means having means for generating a second cyclical pulse train at the frequency of said second sinusoidal signal and in a predetermined phase relationship with respect to said second sinusoidal signal, and phase comparison means responsive to said first cyclical pulse train from said clock and said second cyclical pulse train from said receiving means, said phase comparison means having means for producing a signal representative of the phase relationship between said first and second cyclical pulse trains; said sensor signal receiving means and signal generating means together including first means for applying signals to said phase control input on said clock to step the phase of said first cyclical pulse train by predetermined intervals to represent binary data bits to be transmitted, and second means for applying signals to said phase control input of said clock to step the phase of said first cyclical waveform by said predetermined increments to bring said first cyclical pulse train generally into a predetermined phase relationship with said second cyclical pulse train during an initial period of data reception in order to permit said phase comparison means to be sensitive to subsequent phase shifts of said predetermined intervals in said second sinusoidal signal, said second means for applying signals operating during data reception only until said first cyclical waveform has been brought into said predetermined phase relationship with said second cyclical waveform;

said sensor having means for transmitting said signals representative of operation information only in response to a signal from said central computer designating the particular device associated with that particular sensor.

2. The invention of claim 1 wherein said electrically operated devices are slot machines, and wherein said sensor includes means for detecting coin drop, coin payout, and wheel rotation.

3. In a communications system for interchanging data among members of a plurality of remote electrically operated devices, each of said devices receiving power from a common set of power distribution lines, an improved data link assembly comprising:

locally controlled clock means for generating a first cyclical waveform at a carrier frequency;

transmitter means for applying said first cyclical waveform to said power distribution lines;

phase shifting means for stepping the phase of said first cyclical waveform by predetermined increments in response to signals at a control input;

transmission control means for providing signals at said control input to cause phase shifts of predetermined intervals representative of binary data to be impressed on said first cyclical waveform;

means for receiving a second cyclical waveform at a frequency approximately the same as said carrier frequency appearing on said power distribution lines;

phase comparison means responsive to the phase relationship between said first and second cyclical waveforms; and synchronization control means for providing signals at said control input to step the phase of said first cyclical waveform by said predetermined increments in order to bring said first cyclical waveform generally into a predetermined phase relationship with said second cyclical waveform during an initial period of data reception, whereupon subsequent phase shifts of said predetermined intervals in said second cyclical waveform representative of binary data may be detected, said synchronization control means operating during data reception only until said first cyclical waveform has been brought into said predetermined phase relationship with said second cyclical waveform.

4. The invention of claim 3 wherein said predetermined increments are 90° increments.

5. The invention of claim 3 wherein said transmission control means and said synchronization control means together comprise a programmed microprocessor having first output means operatively coupled to said clock means for generating a cyclical pulse train at a harmonic of said carrier frequency to define said carrier frequency and second output means operatively coupled to said control input.

6. The invention of claim 3 wherein said transmission control means and said phase shifting means are operative to effect 180° phase shifts of said first cyclical waveform to correspond to bit changes in said data.

7. The invention of claim 3 wherein said phase comparison means comprises:

means for generating a voltage level representative of the duty cycle of the logical exclusive OR between said first and second cyclical waveforms;

threshold means for generating a logic level corresponding to said voltage level; and window means for generating a logic level indicative of whether or not said voltage level is representative of a duty cycle generally near 50% corresponding to a phase difference generally near ±90°.

8. In a communication system for interchanging data among members of a plurality of remote electrically operated devices, each of said devices receiving power from a common set of power distribution lines, an improved data link assembly comprising:

(a) a data link including:
  a clock for generating a first cyclical pulse train, said clock having a phase control input and means for varying the phase of said first cyclical pulse train in response to signals at said phase control input;
  transmitting means responsive to said first cyclical pulse train for applying a first carrier signal to said power distribution lines, said first carrier signal having a carrier frequency and being in a constant phase relationship with said first cyclical pulse train;
  receiving means responsive to a second carrier signal generally at said carrier frequency appearing on said power distribution lines, said receiving means having means for generating a second cyclical pulse train at the frequency of said second carrier signal and in a constant phase relationship with said second carrier signal; and
  phase comparison means responsive to said first cyclical pulse train from said clock and said second cyclical pulse train from said receiving means, said phase comparison means having means for producing a signal representative of the phase relationship between said first and second cyclical pulse trains;
(b) signal receiving means and signal generating means together including:
  first means for applying signals to said phase control input on said clock to shift the phase of said first cyclical pulse train by 180° to represent binary data bits to be transmitted; and
  second means for applying signals to said phase control input of said clock to step said phase by 90° increments to bring said first cyclical pulse train into a predetermined phase relationship with said second cyclical pulse train during an initial period of data reception in order to permit said phase comparison means to be rendered sensitive to subsequent 180° phase shifts in said second carrier signal, said second means for applying signals operating during data reception only until said first cyclical waveform has been brought into said predetermined phase relationship with said second cyclical waveform.

9. A system for communication between a central computer and at least one remote electrically operated device, said device receiving power from a set of power distribution lines, comprising:
  means associated with said central computer for sending a polling message on said power distribution line, said polling message having a time structure including a preamble at a carrier frequency followed by binary data represented by phase shifts relative to said preamble;
  a data link associated with said remote electrically operated device comprising:
    locally controlled clock means for generating a first cyclical waveform at a frequency close to said carrier frequency;
    transmitter means for applying said first cyclical waveform to said power distribution lines;
    phase shifting means for stepping the phase of said first cyclical waveform by predetermined increments in response to signals at a control input,
    transmission control means for providing signals at said control input to cause phase shifts of predetermined intervals representative of binary data to be impressed on said first cyclical waveform,
    means for receiving a second cyclical waveform at approximately said carrier frequency appearing on said power distribution lines,
    phase comparison means responsive to the phase relationship between said first and second cyclical waveforms, and
    synchronization control means for providing signals at said control input to step the phase of said first cyclical waveform in order to bring said first cyclical waveform generally into a predetermined phase relationship with said second cyclical waveform during an initial period of data reception, whereupon subsequent phase shifts of said predetermined intervals in said second cyclical waveform representative of binary data may be detected, said synchronization control means operating during data reception only until said first cyclical waveform has been brought into said predetermined phase relationship with said second cyclical waveform;
  said data link thus being operable initially to synchronize with said preamble, then to demodulate said data portion of said polling message, and finally to transmit a response on said power distribution lines.

10. The invention of claim 9 wherein said phase shifting means comprises means for stepping the phase by 90° increments.

11. The invention of claim 9 wherein said transmission control means and said synchronization control means together comprise a programmed microprocessor having first output means operatively coupled to said clock means for generating a cyclical pulse train at a harmonic of said carrier frequency to define said carrier frequency and second output means operatively coupled to said control input.

12. The invention of claim 9 wherein said transmission control means and said phase shifting means are operative to effect 180° phase shifts of said first cyclical waveform to correspond to bit changes in said data.

13. The invention of claim 9 wherein said phase comparison means comprises:
  means for generating a voltage level representative of the duty cycle of the logical exclusive OR between said first and second cyclical waveforms;
  threshold means for generating a logic level corresponding to said voltage level; and
  window means for generating a logic level indicative of whether or not said voltage level is representative of a duty cycle generally near 50% corresponding to a phase difference generally near ±90°.

14. The invention of claim 9 wherein said means associated with said central computer comprises a second data link having the claimed elements of said first-mentioned data link of claim 9.

* * * * *